No. 895,987. PATENTED AUG. 11, 1908.
H. W. EDEN.
INDICATOR FOR LIQUID TANKS.
APPLICATION FILED NOV. 6, 1907.

WITNESSES
Clarence E. Day
Alecia Townsend

INVENTOR
Harold W. Eden
Parker & Burton
Attorneys.

UNITED STATES PATENT OFFICE.

HAROLD W. EDEN, OF DETROIT, MICHIGAN, ASSIGNOR TO P. R. MANUFACTURING COMPANY, OF DETROIT, MICHIGAN.

INDICATOR FOR LIQUID-TANKS.

No. 895,987.      Specification of Letters Patent.      Patented Aug. 11, 1908.

Application filed November 6, 1907. Serial No. 401,000.

*To all whom it may concern:*

Be it known that I, HAROLD W. EDEN, a citizen of the United States, residing at Detroit, county of Wayne, State of Michigan, have invented a certain new and useful Improvement in Indicators for Liquid-Tanks, and declare the following to be a full, clear, and exact description of the same, such as will enable others skilled in the art to which it pertains to make and use the same, reference being had to the accompanying drawings, which form a part of this specification.

This invention relates to indicators for tanks.

It has for its object an improved indicator adapted to be secured to any of the commercial tanks and to be applied to those which have been already in use without the use of solder.

Figure 1:
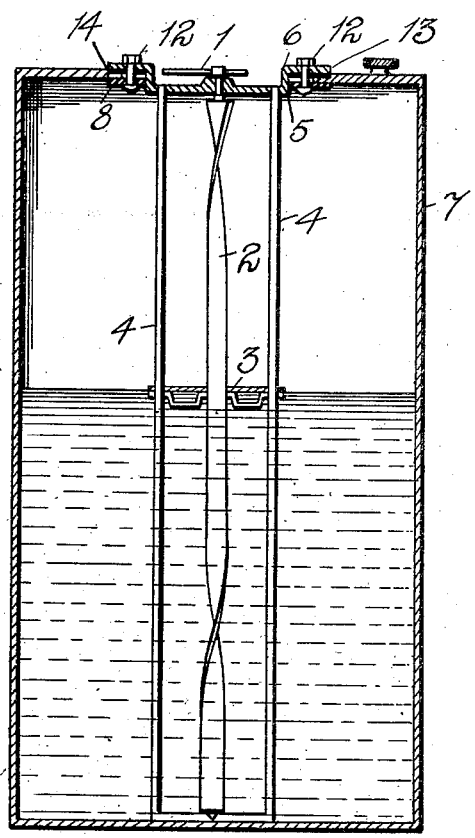
Figure 2:
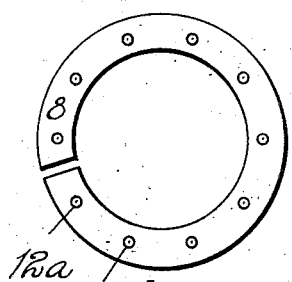
Figure 3:
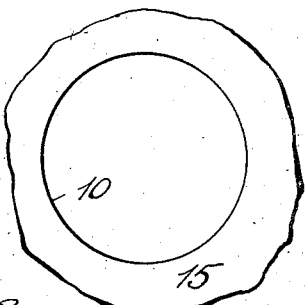
Figure 4:
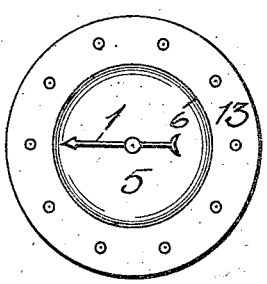

In the drawings:—Figure 1, is a sectional elevation of the tank and indicator. Fig. 2, is a plan of a split ring used to hold the indicator in place in the tank. Fig. 3, shows the opening through the top of the tank. Fig. 4, is a plan of the closure used to stop the hole in the top of the tank, and form the guard for the indicator.

The indicator consists of a pointer 1, mounted on the top of a screw 2, of long pitch which is actuated by a float 3, that has an aperture cut through it to register with the screw and serves to turn the screw as the float rises. The float itself is kept from turning on its vertical axis by hanging guides 4 which hang from the plate 5; the plate 5 forms the bottom of the indicator guard 6, and with the guard comprises the closure to the aperture in the tank 7. In order to secure the plate 5 in place in the tank, it is associated with a split ring 8, that enables it to engage through the aperture 10, cut in the top of the tank.

In order to assemble the parts, the ring 8 is caught to the plate 5 by several of the bolts 12, which pass through holes 12ª, 12ᵇ, through a flange 13 on the plate 5 through the ring 8 and through an interposed gasket 14. The entire indicator with the guides 4 is then placed in position by pushing one end of the split ring under the top 15 of the can, and sliding the ring across the opening and back until the ring 8 is entirely below the top 15, leaving the flange 13 above the top of the tank with the bolts engaging through the flange and the ring, but not through the top of the tank, the remainder of the bolts are then inserted and screwed up tight and the indicator is secured in place.

What I claim is:—

1. In combination with a tank provided with an opening, an indicator provided with a plate adapted to engage through the opening in the tank and a flange projecting from said plate adapted to engage over the walls of the tank the opening through which said ring is introduced being of smaller diameter than the ring itself, a split ring adapted to engage under the walls of the tank and bolts securing the ring and the flange together, substantially as described.

2. In combination with a tank provided with an aperture through its top of less diameter than the body of the tank, a plate adapted to cover said apertured portion and to engage with its peripheral edge over the portion of the top adjacent to said apertured portion, a pointer and a supporting screw therefor engaging partly within and partly without the tank, means adapted to be actuated by the rise and fall of fluid therein for communicating motion to said pointer, a ring engaging on the inside of the walls of the tank adjacent to the apertured portion, and bolts engaging through the peripheral edge of the plate, the walls of the tank adjacent to the apertured portion and through said ring, whereby they are brought into close relation with one another, substantially as described.

In testimony whereof, I, sign this specification in the presence of two witnesses.

HAROLD W. EDEN.

Witnesses:
    MAY E. KOTT,
    CHARLES F. BURTON.